United States Patent
Matsushita

(10) Patent No.: US 7,639,424 B2
(45) Date of Patent: Dec. 29, 2009

(54) DISPLAY SYSTEM FOR VEHICLE

(75) Inventor: Junichi Matsushita, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/010,733

(22) Filed: Jan. 29, 2008

(65) Prior Publication Data

US 2008/0186587 A1 Aug. 7, 2008

(30) Foreign Application Priority Data

Feb. 1, 2007 (JP) ............................. 2007-022717

(51) Int. Cl.
*G02B 27/10* (2006.01)
(52) U.S. Cl. ...................................... 359/618; 359/630
(58) Field of Classification Search .................. 359/630, 359/13
See application file for complete search history.

(56) References Cited

U.S. PATENT DOCUMENTS 5,013,135 A * 5/1991 Yamamura .................. 359/630

2007/0064174 A1 * 3/2007 Kitamura et al. .............. 349/69

FOREIGN PATENT DOCUMENTS

JP 2002-293162 10/2002

* cited by examiner

*Primary Examiner*—Jordan M. Schwartz
*Assistant Examiner*—James C Jones
(74) *Attorney, Agent, or Firm*—Edwards Angell Palmer & Dodge LLP

(57) ABSTRACT

A display system for a vehicle which is able to maintain display quality and to be mounted on a vehicle of various types. A display system for a vehicle has an indicator, a backlight arranged on a back side of the indicator, a light ray controller and a direction adjusting member. The backlight emits a light passing through the indicator. The light ray controller is arranged between the indicator and the backlight, and controls a direction of light going from the backlight to the indicator. The direction adjusting member holds the light ray controller, and adjusts a direction of a light ray passed through the indicator.

4 Claims, 4 Drawing Sheets

DISPLAY SYSTEM FOR VEHICLE

The priority application Number Japan Patent Application No. 2007-022717 upon which this patent application is based is hereby incorporated by reference.

BACKGROUND OF THE INVENTION

1. Field of the Invention

The present invention relates to a display system for a vehicle to be mounted on the vehicle, and a virtual image projected on a projection area of the vehicle, onto which area light outgoing from the backlight passed through the indicator is projected, and a front view of the vehicle to be seen from an eye point of the vehicle through the projection area are seen in a superimposed manner.

2. Description of the Related Art

Recently, with increase and diversification of information required by a driver during a drive, a projection-type display unit called a head-up display (HUD) device has been adopted so that information, which cannot be displayed in a meter unit due to the lack of the space, is displayed on a windshield as a virtual image, thereby a driver can see the foreground of the vehicle through the windshield together with the virtual image, which is superposed upon the foreground. As shown in a patent document 1, in the HUD device, it is known to use a liquid crystal display (LCD) or a natural light device of a vacuum fluorescent display (VFD) as an indicator (display device), which displays a virtual image on a windshield.

A backlight of an indicator which is used in a HUD device has two major types, an edge-light type and a direct-light type. In the edge-light type, a ray from illuminant (CCT, LED, etc.) arranged on an end part of a light guide plate is transmitted on a specific area by using the light guide plate and is reflected. That is, a backlight of the edge-light type is a surface illuminant. The edge-light type can give uniform surface brightness through a diffuser plate which is arranged between the surface light source and the indicator. In the direct-light type, a light source of LED is arranged behind an indicator, and light which is diffused by a diffuser plate is transmitted. Thereby, the direct-light type has high brightness compared to the edge-light type.

Patent Document 1:

Japan published patent application 2002-293162

SUMMARY OF THE INVENTION

However, various indicators which are used in a HUD device require constant brightness in a specific visual angle area so as to keep quality or brightness of an image (virtual image). Especially, in case of the direct-light type, it is desirable to set an indicator at a place where brightness of the visual angle area is high so as to increase efficiency in the use of a light ray. However, when a light source is close to an indicator, brightness of an image becomes non-uniform. As a result, it is difficult to equalize the brightness. Also, a space between the light source and the indicator must be increased so as to equalize the brightness. Thereby, the body of the indicator is getting bigger.

A displayed light path from a HUD device to a projection area in a windshield or a combiner is different depending on a kind of a vehicle. In addition, a direction of a light ray from an indicator depends on a HUD device. Thereby, a mounting position or a mounting angle is limited by a HUD device in a vehicle. Furthermore, each HUD device according to multiple kinds of vehicle cannot be standardized because it is required to design each HUD device corresponding to each vehicle.

It is therefore an objective of the present invention to solve the above problem and to provide a display system for a vehicle by which display quality can be kept, and the display system can be mounted on multiple kinds of vehicles.

According to a first aspect of the present invention, a display system for a vehicle has an indicator and a backlight. The backlight is arranged at a back side of the indicator, and emits light passing through the indicator. The display system is mounted on a vehicle. A virtual image and a foreground of the vehicle are seen together in a superimposed manner by the display system. The visual image is given by projecting light outgoing from the backlight passed through the indicator on a projection area. The foreground of the vehicle can be seen from an eye point of the vehicle through the projection area. Furthermore, the display system has a light ray controller and a direction adjusting member. The light ray controller is arranged between the indicator and the backlight, and controls a direction of light going from the backlight to the indicator. The direction adjusting member holds the light ray controller, and adjusts a direction of a light ray passing through the indicator to the projection area of the vehicle.

According to a second aspect of the present invention, as mentioned above, the display system has a lens array. The lens array is arranged between the indicator and the backlight, and transmits light going from the backlight to the indicator. The light ray controller is positioned between the indicator and the lens array.

According to a third aspect of the present invention, as mentioned above, the light ray controller is a Fresnel lens.

According to the present invention, even if the displayed light path going from the display system to the projection area is different depending on types of vehicle, a direction of a light ray can be changed simply by adjusting the direction adjusting member. Furthermore, the light ray controller controls a direction of light going from the backlight to the indicator. As a result, a visual angle area of the light can be set to a prescribed area, and high brightness can be kept. Thereby, it is not required to redesign and produce component parts of the backlight depending on types of vehicle. Also, display quality can be maintained, and the component parts of the backlight can be mounted on many different types of vehicles. Therefore, the display system can be standardized with a simple structure.

According to the present invention, in addition to the above mentioned advantage, light from the backlight can be emitted to the indicator. Furthermore, a direction of light can be adjusted by the direction adjusting member. Therefore, a visual angle area of light emitted from the indicator can be set to a prescribed area.

According to the present invention, in addition to the above mentioned advantage, by using a Fresnel lens which can align a direction of a light ray with a displayed light path, the display system of the present invention is able to correspond to various vehicles more easily. Also, by adjusting parameters of the Fresnel lens (curvature, Korenich constant, polynomial aspheric surface coefficient, etc.), a visual angle area of the light ray can be set to a prescribed area. Thereby, a direction of the light ray can be adjusted accurately further.

The above and other objects and features of this invention will become more apparent from the following description taken in conjunction with the accompanying drawings.

DESCRIPTION OF THE PREFERRED EMBODIMENT

In the following, a display system for a vehicle according to a preferred embodiment of the present invention will be explained with reference to FIGS. 1-5.

Figure 1:
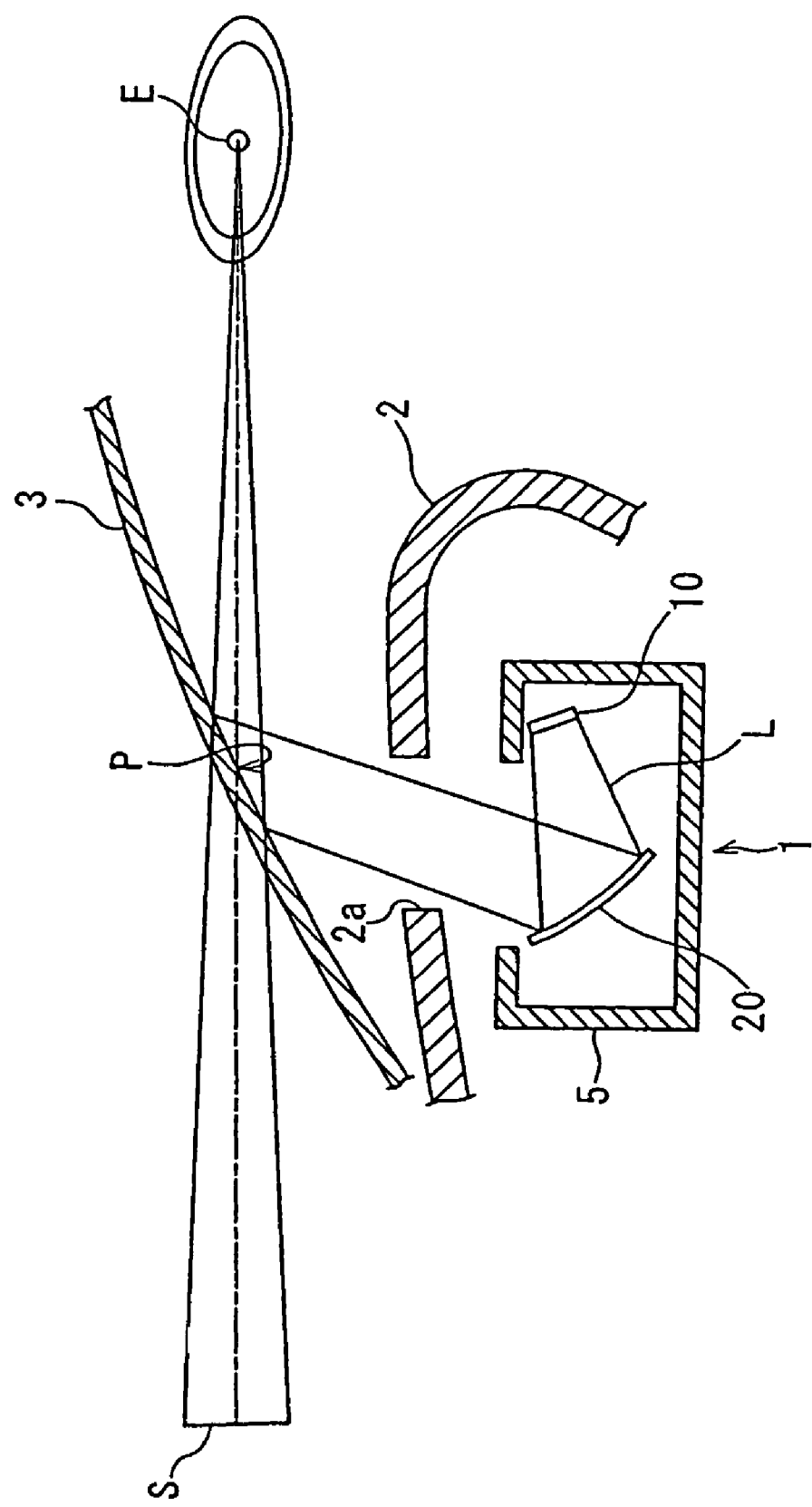
FIG. 1 is a block diagram showing one embodiment of structure of a head-up display device, in which a display system for a vehicle of the present invention is applied.

As shown in FIG. 1, a head-up display (HUD) device 1 is arranged in an instrument panel 2 of vehicle, and mounted on the vehicle. The HUD device 1 has a display system 10 for a vehicle of the present invention, and a reflecting member 20. The display system 10 and the reflecting member 20 are received in a receiving case 5. That is, the display system 10 is positioned in a predetermined place by the receiving case 5 of the vehicle.

Figure 2:
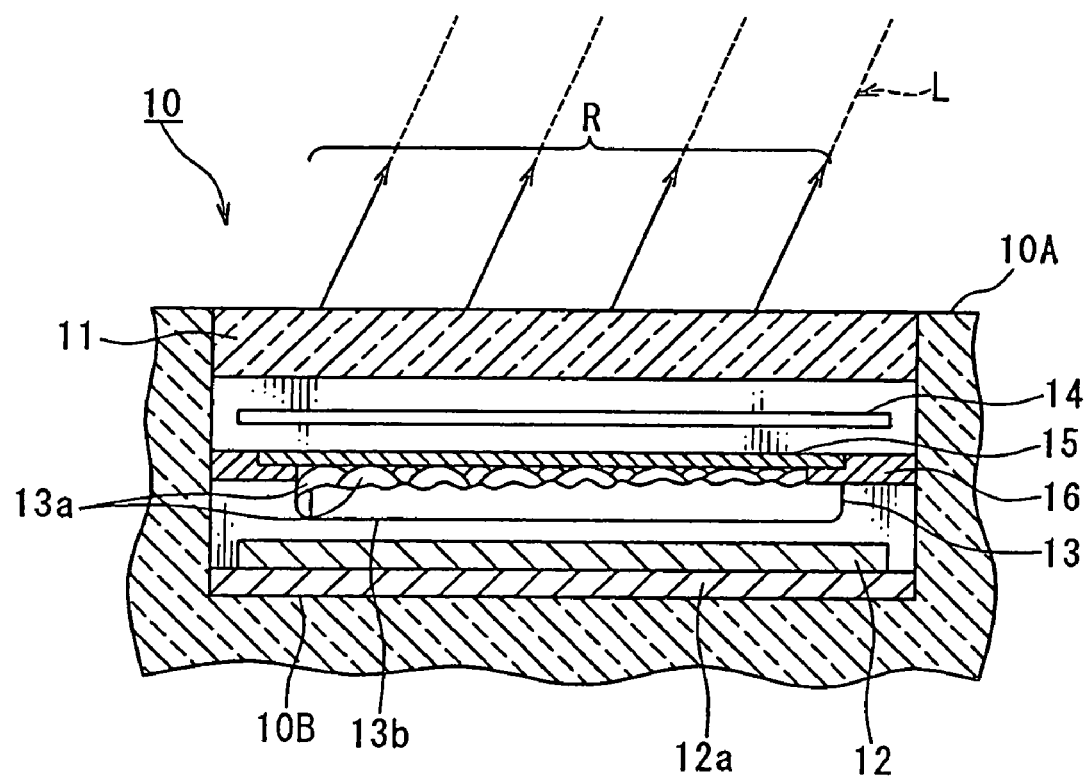
FIG. 2 is a sectional diagram to illustrate structure of the display system for the vehicle of the present invention.

As shown in FIG. 2, the display system 10 has an indicator 11, a backlight 12, a lens array 13, a diffuser plate 14, a Fresnel lens 15 as a light ray controller and a direction adjusting member 16. These are mounted on housing 10A. In the display system 10, a virtual image S is superposed on a foreground of a vehicle. The virtual image S is given by projecting a light ray R from the backlight 12 passed through the indicator 11 on a projection area P. The foreground of the vehicle can be seen from an eye point E of the vehicle through the projection area. In the present invention, the light ray R is adjusted by the direction adjusting member 16 so as to align a displayed light path L from the display system 10 to a projection area P.

A LCD (liquid crystal display) transmitting a light from a back side, a thin-film transistor (TFT) liquid crystal and a dual-scan super twisted nematic (DSTN) liquid crystal are used as the indicator 11. The indicator 11 displays an image which shows characters required from a control device (not shown), and performs luminescent display by transmitted light from the backlight 12.

The backlight 12 is arranged opposite to a back side of the indicator 11, and emits light passing through the indicator 11. A LED or various light sources, for example a fluorescent tube, is used as the backlight 12. The backlight 12 is mounted on a printed wiring board 12a. The printed wiring board 12 is assembled in a housing 10A. When the indicator 11 displays an image, the backlight 12 is lighted up by controlling of the control device.

The lens array 13 is an optical element in which a plurality of hemispherical lenses 13a is lined. A plurality of lenses 13a is arranged in parallel, and is formed by a translucent member. In the lens array 13, a projection portion of each lens 13a is assembled on the light ray controller toward the indicator 11. A flat surface 13b opposite to the projection portion of lens 13a is attached on the direction adjusting member opposed to the backlight 12. An incident light from the backlight 12 is emitted to the indicator 11 by the lens 13a of the lens array 13.

The diffuser plate 14 is formed into a thin plate shape, and is attached between the indicator 11 and the Fresnel lens 15. An incident light from the Fresnel lens 15 is diffused and emitted to the indicator 11 by the diffuser plate 14.

The Fresnel lens 15, as is well known, is cut into a thin ring shape. The Fresnel lens 15 is a lens similar to a shape of flat structure or flat dent lens. The Fresnel lens 15 is formed by a die, and is made on plastic of plane shape as a large lens. By chopping a pitch (for example, 0.1 mm not over), the Fresnel lens 15 can be given lens effects with diffusion effects. Thereby, non-uniformity at a boundary area between lenses 13a of lens array 13 can be reduced. The Fresnel lens 15 is arranged between the lens array 13 and the diffuser plate 14. A light ray from the lens array 13 is entered on the Fresnel lens 15. And then, the Fresnel lens 15 transmits the light ray and emits the light ray toward the diffuser plate 14.

Figure 3:
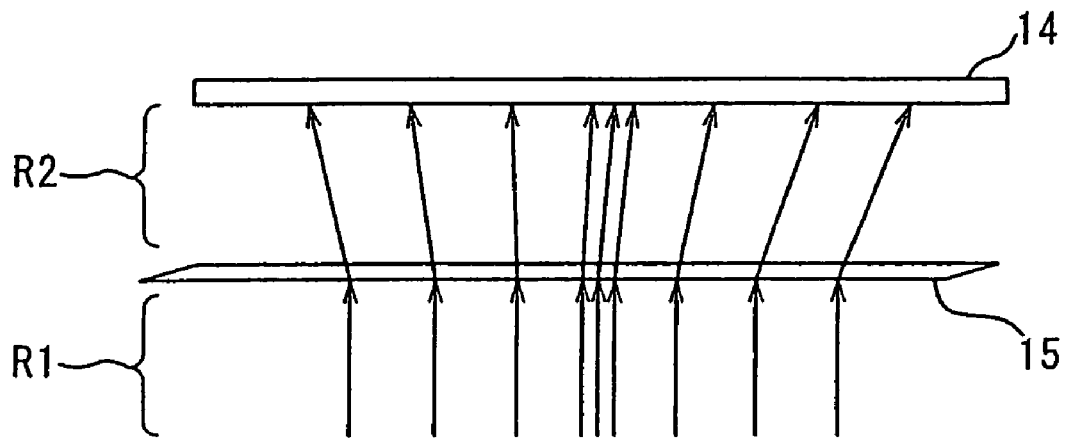
FIG. 3 is a diagram showing tracing example of a light ray of a Fresnel lens in FIG. 2.

In the preferred embodiment, the Fresnel lens 15 is used. As shown in FIG. 3, the Fresnel lens 15 reflects the light ray R2 passing through the Fresnel lens 15 to the diffuser plate 14. Furthermore, a refraction angle in the center of the Fresnel lens 15 is small. The refraction angle increases gradually as the distance from the center portion. However, the present invention is not limited thereto. Other modifications such as the light ray controller (Fresnel lens 15), which emits the light ray R2 and aligns the light ray R2 with the displayed light path L, are also possible.

Figure 4:
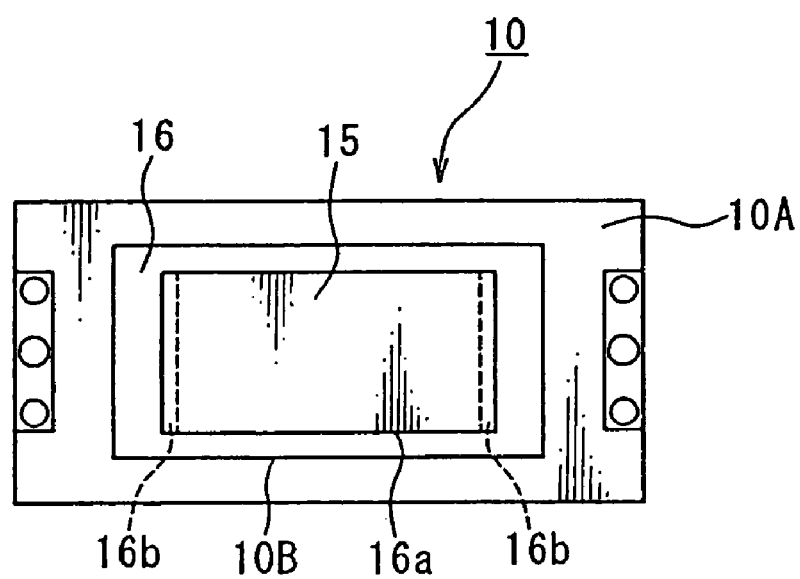
FIG. 4 is a diagram to illustrate a relation of the Fresnel lens and a direction adjusting member.

As shown in FIG. 4, the direction adjusting member 16 is formed into a plane shape larger than the Fresnel lens 15. The direction adjusting member 16 has a fitting section 16a and a locking section 16b. The fitting section 16a fits the Fresnel lens 15 in the center of the direction adjusting member 16. The locking section 16b is connected to the fitting section 16a, and locks an edge part of inner side of the Fresnel lens 15. The direction adjusting member 16 is assembled in the housing 10A as positioning the Fresnel lens 15 between the lens array 13 and the diffuser plate 14. Therefore, by assembling the Fresnel lens 15 in the housing 10A in a state of fitting in the fitting section 16a, the light ray R from the indicator 11 can be aligned with the displayed light path L. Thereby, the direction adjusting member 16 can adjust a direction of the light ray R.

More specifically, although the display system 10 is mounted on a mounting position which is assigned from maker of vehicles, the light ray R can be aligned with the displayed light path L simply by forming the direction adjusting member 16 depending on type of a vehicle. Thereby, other components can be used commonly. Consequently, the display system 10 can be standardized at easy structure.

A method of assembling the above mentioned display system 10 for a vehicle according to one embodiment is explained.

The backlight 12 is mounted on the printed wiring board 12a which is assembled on an assembling section 10B of the housing 10A. The lens array 13 is assembled oppositely to the backlight 12. The Fresnel lens 15 is assembled in the direction adjusting member 16 corresponding to a vehicle mounting the display system 10. The direction adjusting member 16 is assembled on the assembling section 10B of the housing 10A. After the diffuser plate 14 and the indicator 11 are assembled above the Fresnel lens 15, the assembling method of the display system 10 finishes. Thereafter, the display system 10 is fixed to a predetermined assembling position in the instrument panel 2 of a vehicle.

An action (working) of the above mentioned display system 10 according to one embodiment is explained below.

When the backlight 12 lights up while at the same time an image is displayed on the indicator 11, a light ray emitted by the backlight 12 is transmitted to the Fresnel lens 15. The Fresnel lens 15 refracts an incident light, and emits a light ray. After the incident light is diffused by the diffuser plate 14, the ray passed through the indicator 11 is emitted as the light ray R. As a result, the indicator 11 emits light by the light ray R.

The light ray R emitted from the indicator 11 is reflected by the reflecting member 20, and is projected on a windshield 3. As a result, a diver can see a virtual image S of an image of the indicator 11, which is projected on the windshield 3, together with a foreground of the vehicle visible from an eye point E through the windshield 3.

Figure 5:
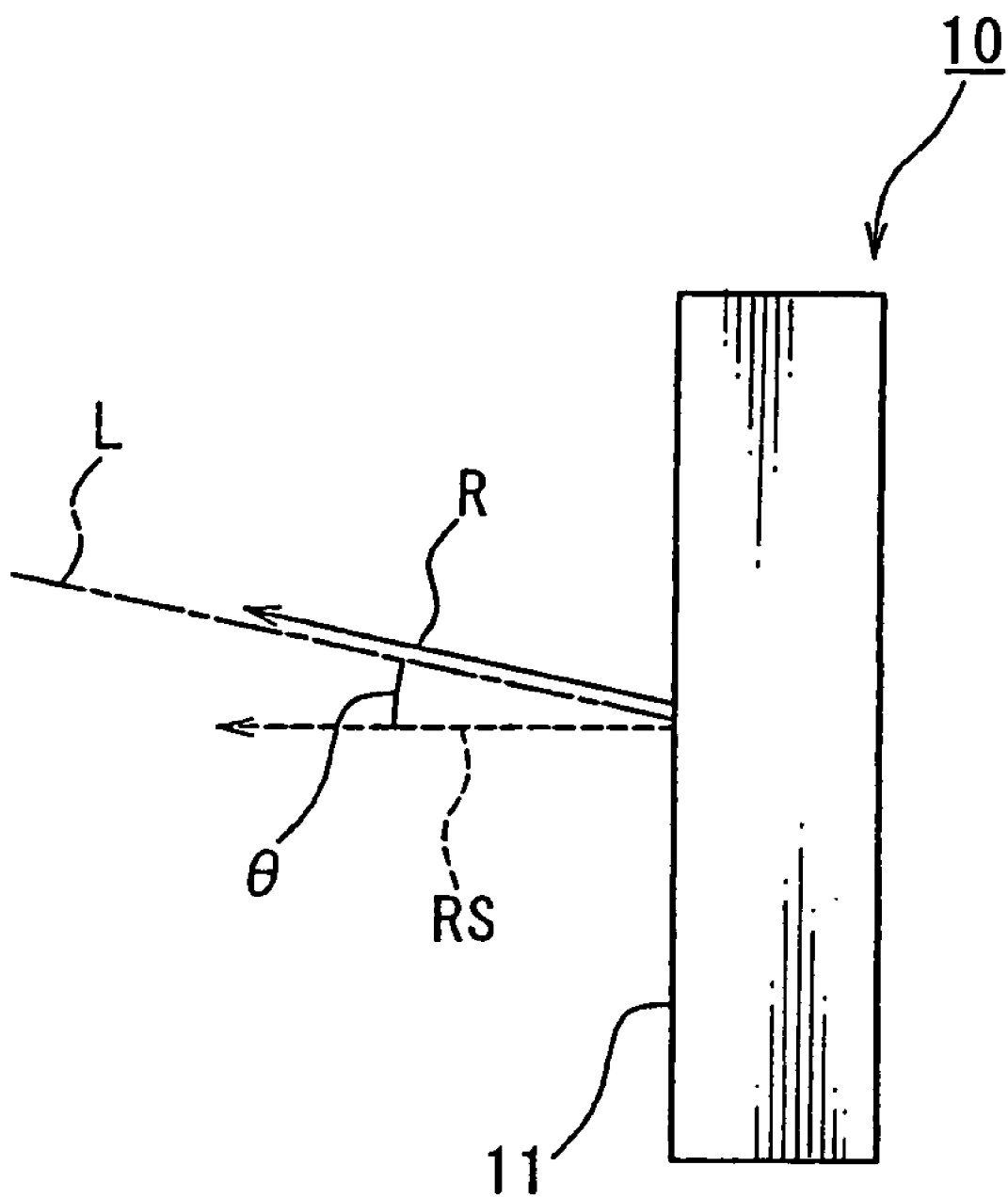
FIG. 5 is a diagram to illustrate a relation of a displayed light path of vehicle and a light ray of the display system for a vehicle.

As an example, a relation between the light ray R of the display system 10 and the displayed light path L of vehicle is explained below by referring to FIG. 5.

When the display system 10 which emits a light ray RS from the indicator 11 is mounted on a vehicle, a direction of the displayed light path L of the vehicle may differ from a direction of the light ray RS. In case that difference is occurred, a layout of the fitting section 16a in the direction adjusting member 16 is changed so as to adjust a position of the Fresnel lens 15 in the housing 10A. As a result, by using the direction adjusting member 16, even if an assembling position of the display system 10 is changed by switching to another vehicle, the light ray R can be aligned with the displayed light path L of the vehicle.

According to the above described display system 10 for a vehicle, the Fresnel lens (light ray controller) 15 controls a direction of light going from the backlight 12 to the indicator 11. A direction of the light ray R is adjusted by the direction adjusting member 16 so that the light ray R passed through the indicator 11 is aligned with the displayed light path L from the display system 10 to the projection area P of the vehicle. Thereby, even if the displayed light path L from the display system 10 to the projection area P is different depending on types of vehicle, the direction of the light ray R can be adjusted by changing the direction adjusting member 16, or by changing the direction adjusting member 16 and the Fresnel lens 15. Furthermore, the light ray controller 16 can control a direction of light going from the backlight 12 to the indicator 11. Thereby, a view angle area of the light ray R can be set to a predetermined area, and high brightness can be kept. Therefore, it is not required to design and to produce components of the backlight 12 according to types of vehicle. Also, the display system 10 can maintain visual quality, and can be mounted on various vehicles. Thereby, the display system 10 can be standardized at simple structure.

The lens array 13, which transmits light from the backlight 12 to the indicator, is arranged between the indicator 11 and the backlight 12. The Fresnel lens 15 (light ray controller) assembled in the direction adjusting member 16 is arranged between the indicator 11 and the lens array 13. Accordingly, the light from the backlight 12 can be emitted to the indicator 11 widely by the Fresnel lens 15. In addition, the visual angle area of the light ray R which is emitted from the indicator 11 can be set to a prescribed area so that a direction of light can be adjusted by the direction adjusting member 16.

In the preferred embodiment of the present invention, by using the Fresnel lens 15 as the light ray controller, the Fresnel lens 15 can align the light ray R with the displayed light path L. Therefore, it is possible to respond to types of vehicle more simply. Also, by adjusting parameter of the Fresnel lens (curvature, Korenich constant, polynomial aspheric surface coefficient, etc.), the visual angle area of light ray can be set to a predefined area. Thereby, a direction of the light ray can be adjusted more accurately. However, the present invention does not limit it. The light ray controller can use various lenses, for example an aspheric lens.

While the invention has been described with reference to specific embodiments, the description is illustrative and not to be construed as limiting the scope of the invention. That is to say, various changes and modifications can be made without departing from the scope of the invention as defined by the following claims.

What is claimed is:

1. A display system for a vehicle adapted to be mounted on different vehicles comprising:
    an indicator;
    a backlight arranged on a back side of the indicator and emitting light passing through the indicator;
    a light ray controller arranged between the indicator and the backlight, and controlling a direction of light going from the backlight to the indicator; and
    a direction adjusting member including a fitting section for fitting the light ray controller in a center of the direction adjusting member and a locking section for locking an edge part of an inner side of the light ray controller, thereby adjustably holding the light ray controller so as to adjust a direction of a light ray passed through the indicator to a projection area of the vehicle,
    wherein a virtual image projected on the projection area of the vehicle, onto which area light outgoing from the backlight passed through the indicator is projected and a front view of the vehicle to be seen from an eye point of the vehicle through the projection area are seen in a superimposed manner.

2. The display system as claimed in claim 1, further comprising a lens array arranged between the indicator and the backlight and transmitting light from the backlight toward the indicator,
    wherein the ray controller is positioned between the indicator and the lens array.

3. The display system as claimed in claim 1, wherein the ray controller is a Fresnel lens.

4. The display system as claimed in claim 2, wherein the ray controller is a Fresnel lens.

* * * * *